United States Patent
Yun et al.

(10) Patent No.: US 10,194,324 B2
(45) Date of Patent: Jan. 29, 2019

(54) CARRIER AGGREGATION USING SHARED SPECTRUM

(71) Applicant: Spectrum Effect Inc., Seattle, WA (US)

(72) Inventors: Jungnam Yun, Seattle, WA (US); David Ryan, Seattle, WA (US); Vafa Ghazi-Moghadam, Seattle, WA (US); Rekha Menon, Seattle, WA (US)

(73) Assignee: SPECTRUM EFFECT INC., Kirkland, WA (US)

( * ) Notice: Subject to any disclaimer, the term of this patent is extended or adjusted under 35 U.S.C. 154(b) by 0 days.

(21) Appl. No.: 14/827,232

(22) Filed: Aug. 14, 2015

(65) Prior Publication Data

US 2016/0050690 A1    Feb. 18, 2016

Related U.S. Application Data (60) Provisional application No. 62/037,554, filed on Aug. 14, 2014.

(51) Int. Cl.
  *H04W 74/04*    (2009.01)
  *H04W 16/14*    (2009.01)
  *H04W 72/12*    (2009.01)
  *H04W 72/04*    (2009.01)

(52) U.S. Cl.
  CPC ....... *H04W 16/14* (2013.01); *H04W 72/1226* (2013.01); *H04W 72/0453* (2013.01)

(58) Field of Classification Search
  CPC ..... H04W 16/14; H04W 76/02; H04W 92/02; H04W 72/00; H04B 1/713
  See application file for complete search history.

(56) References Cited

U.S. PATENT DOCUMENTS

| | | | | |
|---|---|---|---|---|
| 2006/0008016 A1* | 1/2006 | Balakrishnan | ......... | H04B 1/719 375/260 |
| 2007/0195898 A1* | 8/2007 | Yamaguchi | .......... | H04B 1/0475 375/260 |
| 2011/0223877 A1* | 9/2011 | Tillman | ................ | H04W 16/14 455/226.2 |
| 2012/0184318 A1* | 7/2012 | Lee | ........................ | H04W 16/14 455/515 |
| 2012/0307869 A1* | 12/2012 | Charbit | .................. | H04B 1/715 375/132 |

* cited by examiner

*Primary Examiner* — Mansour Oveissi (57) ABSTRACT

A method for performing Carrier Aggregation (CA) using spectrum shared between an incumbent user and a telecommunications network includes establishing a primary cell (PCell) for the secondary user in a portion of radio spectrum that is exclusively licensed to the telecommunications network, establishing a secondary cell (SCell) for the telecommunications network in a portion of the shared spectrum that is shared with the incumbent user, receiving schedule data for the incumbent user at a controller in communication with the incumbent user and a transmitter for the PCell and the SCell, scheduling transmissions for the PCell and the SCell to avoid interference to the incumbent user, and transmitting the scheduled transmissions through the PCell and the SCell using Carrier Aggregation (CA). Accordingly, one or more SCell in shared spectrum may be aggregated with a PCell in dedicated spectrum.

21 Claims, 7 Drawing Sheets

CARRIER AGGREGATION USING SHARED SPECTRUM

CROSS-REFERENCES TO RELATED APPLICATIONS

The present invention claims priority to U.S. Provisional Application No. 62/037,554, filed Aug. 14, 2014, which is incorporated by reference herein for all purposes.

BACKGROUND OF THE INVENTION

Carrier Aggregation (CA) has been specified by the 3$^{rd}$ Generation Partnership Project (3GPP) for Long Term Evolution-Advanced (LTE-A). CA is used to increase the bit rate by allowing multiple carriers to be aggregated and jointly used. Each aggregated carrier is referred to as a component carrier (CC). CA in LTE supports carrier aggregations for both contiguous and non-contiguous CCs.

Figure 1A:
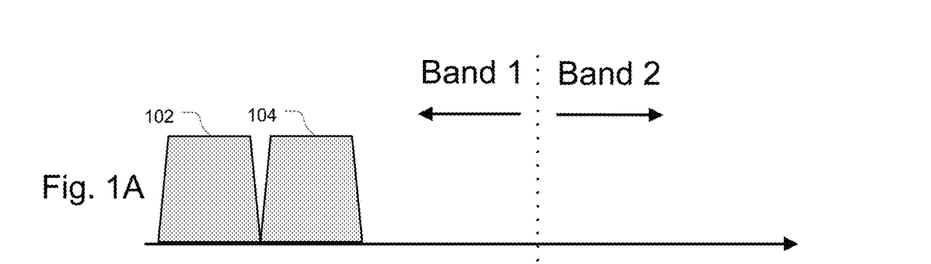
FIGS. 1A, 1B and 1C illustrate carrier aggregation in LTE-Advanced.
Figure 1B:
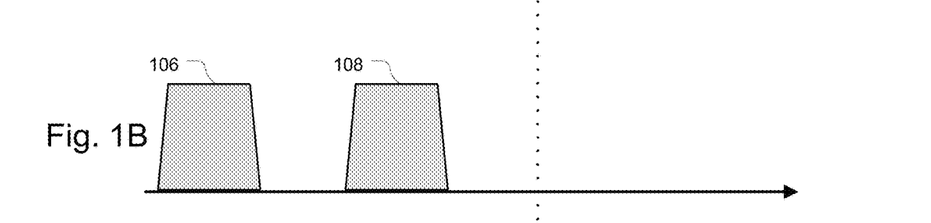
Figure 1C:
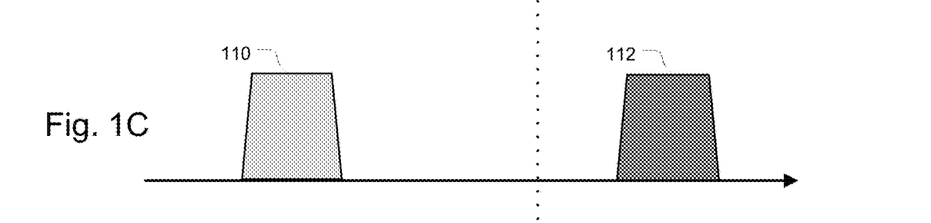

Several types of CC configurations can be aggregated in CA. FIG. 1 shows first and second CCs 102 and 104 that are intra-band and contiguous with one another. The non-contiguous CCs 106 and 108 of FIG. 1B can also be aggregated. As shown in FIG. 1C, a CC 110 can still be aggregated with CC 112 even though the non-contiguous CCs are in different frequency bands.

In LTE-Advanced, each CC is limited to bandwidths of 1.4, 3, 5, 10, 15 or 20 MHz and a maximum of five component carriers can be aggregated. When using Frequency Division Duplexing (FDD), user equipment (UE) can aggregate different numbers of CCs in the downlink communications from uplink communications. In addition, the carriers that are aggregated can have different bandwidths. However, the number of uplink CCs may not exceed the number of downlink CCs. In addition, for Time Division Duplexing (TDD) in LTE, the number of CCs as well as the bandwidth of each CC is the same for both uplink and downlink.

When CA is configured in LTE-A, each UE is connected to the cellular network through a single Radio Resource Control (RRC) connection. The serving cell that provides this connection is called the Primary Cell (PCell). When CA is active for a UE, any other cells that are used in CA are referred to as Secondary Cells (SCells). SCells are configured for UEs after establishing a connection through the PCell.

The downlink and uplink CCs associated with the PCell are known as the downlink and uplink primary component carriers (PCCs). SCells may be freely added, removed, activated or deactivated, but the PCell can only be changed by a handover procedure. UE connectivity and handover activity is associated with the PCell, and all cell searching in idle or connected mode is performed relative to PCell operating channels.

Certain portions of spectrum are reserved for incumbent users that make limited use of that spectrum. As wireless technologies evolve, the value of radio spectrum increases, and it becomes more economical to share spectrum between users while minimizing interruption to the incumbent users. However, LTE-A does not specify the operation of CA in a spectrum sharing environment.

BRIEF SUMMARY OF THE INVENTION

Embodiments of the present disclosure relate to a system and method that expand the functionality of carrier aggregation and facilitate carrier aggregation in a spectrum sharing environment.

In an embodiment, a method for performing Carrier Aggregation (CA) using spectrum shared between an incumbent user and a telecommunications network includes establishing a primary cell (PCell) for the secondary user in a portion of radio spectrum that is exclusively licensed to the telecommunications network, establishing a secondary cell (SCell) for the telecommunications network in a portion of the shared spectrum that is shared with the incumbent user, receiving schedule data for the incumbent user at a controller in communication with the incumbent user and a transmitter for the PCell and the SCell, scheduling transmissions for the PCell and the SCell to avoid interference to the incumbent user, and transmitting the scheduled transmissions through the PCell and the SCell using Carrier Aggregation (CA).

The schedule data for the incumbent user may indicate interference from the SCell to the incumbent user, and the method may further include dynamically reconfiguring the SCell by moving the SCell from a first frequency band to a second frequency band to avoid the interference from the SCell to the incumbent user. Such a process may further include determining a frequency band in the shared spectrum with the least chance of interfering with the incumbent user where the second frequency band is the frequency band with the least chance of interfering with the incumbent user.

In an embodiment in which the schedule data for the incumbent user includes a spectrum mask, the method may include using the spectrum mask to determine that the second frequency band has a lowest probability of interfering with incumbent user transmissions of frequency bands in the shared spectrum. The schedule data may be received by a central controller entity that coordinates scheduling between the incumbent user and the telecommunications network. In addition, schedule data for the incumbent user may not be transmitted to a scheduler for the primary and secondary cells.

Secondary cells in the shared spectrum may be disabled when not in use. In addition, the bandwidth occupied by the PCell may be half or less of the bandwidth occupied by the Scell. Accordingly, a system can exploit large portions of shared spectrum even when there is a limited amount of dedicated spectrum. The incumbent user may use a frequency hopping transmission pattern in the shared spectrum.

An embodiment of the present disclosure is a telecommunications system that performs Carrier Aggregation using shared spectrum. The system may include a controller with a communication channel to network equipment of a network that is an incumbent user of the shared spectrum, the controller receiving schedule data for the incumbent user over the communication channel. In addition, the system may include a base station in communication with a user equipment (UE), where the base station is operative to establish a primary cell (PCell) for the secondary user in a portion of radio spectrum that is exclusively licensed to the telecommunications network, establish a secondary cell (SCell) for the telecommunications network in a portion of the shared spectrum that is shared with the incumbent user, and transmit the scheduled transmissions through the PCell and the SCell using Carrier Aggregation (CA). In such a system, transmissions for the PCell and the SCell are scheduled to avoid interference to the incumbent user.

DETAILED DESCRIPTION OF THE INVENTION

Embodiments of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures. The scope of this disclosure is limited only by the claims and encompasses numerous alternatives, modifications and equivalents. Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured. Although the examples of this disclosure use LTE telecommunications technology, embodiments are not so limited, and can be applied to other communications technologies as well.

Figure 2:
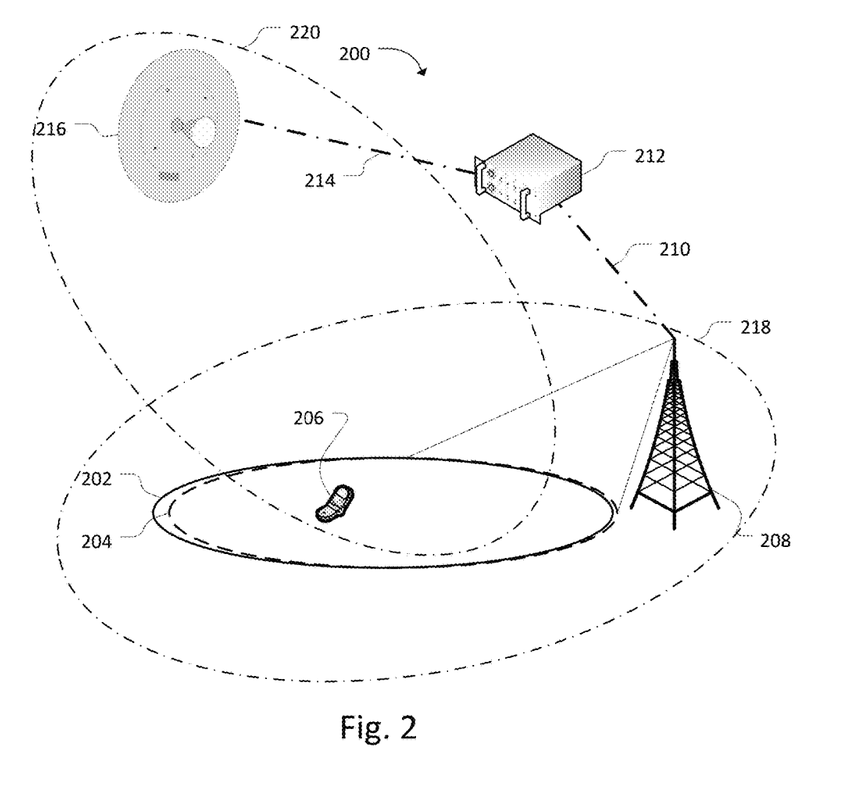
FIG. 2 illustrates an embodiment of a system that aggregates carriers in a shared spectrum environment.

FIG. 2 shows an embodiment of a communications system 200 according to an embodiment of the present disclosure. The system 200 includes a primary cell (PCell) 202 and a secondary cell (SCell) 204 that are serving an area occupied by user equipment (UE) 206. PCell 202 and SCell 204 are both served by base station 208, which is coupled to a controller 212 through communication channel 210. In an LTE embodiment, base station 208 may be an eNodeB, and controller 212 may be a Self-Organizing Network server or a Radio Resource Controller (RRC) which is coupled to the eNodeB through a wired or wireless link.

The controller 212 is also connected to network equipment 216 through communication channel 214, which may be a wired or wireless link. In an embodiment, network equipment 216 is a transmitter for an incumbent user of a portion of spectrum that is shared with base station 208. A transmitter 216 may be any of a variety of radio transmitters, such as a radar antenna, a satellite, or a base station such as an eNodeB. Government, military and research applications currently occupy a substantial amount of radio spectrum that can be shared with a telecommunications network.

In system 200, the incumbent network equipment 216 shares radio spectrum with SCell 204. In other words, SCell 204 occupies a portion of radio spectrum for which transmitter 216 is allocated, or licensed by a government entity, to be a primary user. Primary cell 202 occupies a portion of spectrum for which cellular telecommunications is the incumbent user, and may be the exclusive user. UE 206 is coupled to PCell 202 as well as SCell 204, which are aggregated to communicate with UE 206 through Carrier Aggregation (CA). The coverage are of PCell 202 may differ from the coverage are of SCell 204 due to pathloss differences between their respective carrier frequencies.

FIG. 2 also shows a first network 218 and a second network 220. In the embodiment of FIG. 2, first network 218 is a cellular telecommunications network, and second network 220 is a radar network. The first network 218 may not communicate directly with the second network 220, but both networks may communicate with the controller 212. First network 218 may use a portion of spectrum exclusively dedicated to the first network 218 for PCell 202, and use a portion of spectrum that is shared with second network 220 for SCell 204.

The controller 212 may be independent, or may be part of first network 218 or second network 220. In an embodiment, elements of a controller 212 are incorporated into existing network equipment such as base station 208. Thus, while aspects of various embodiments are described as being performed by a controller, persons of skill in the art will recognize that some of those functions can be performed by similar hardware located at a base station or other network entity.

In conventional LTE operations, PCell 202 and SCell 204 are UE-specific. One cell can be configured as a PCell for a particular UE 206, while the same PCell 202 can be configured as an SCell 204 to another UE. In contrast, an embodiment of the present disclosure may configure PCell 202 and SCell 204 so that a PCell for a particular UE cannot be assigned to be an SCell for a different UE. However, the same PCell and SCell can be used by different UEs. Thus, PCell 202 may be assigned an identifier that is used to attach to UE 206 such that PCell 202 is not available to be assigned as an SCell to any other UE.

Figure 3:
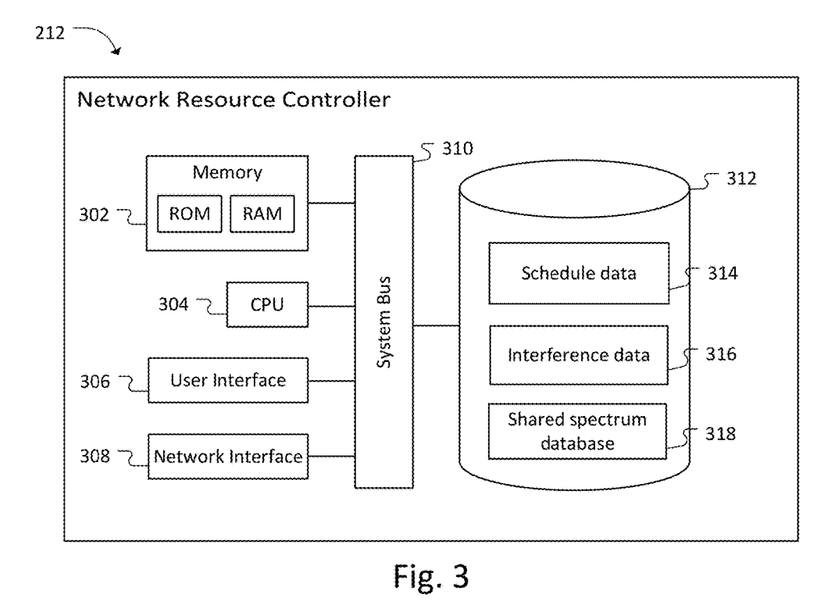
FIG. 3 illustrates an embodiment of a controller computer.

FIG. 3 shows an embodiment of a Network Resource Controller 300, which may be the controller 212 shown in FIG. 2. The NRC 300 has one or more processor devices including a CPU 304. The CPU 304 is responsible for executing computer programs stored on volatile and non-volatile memories 302 and a storage device 312 (e.g., HDD or SSD). In some embodiments, storage device 312 may store program instructions as logic hardware such as an ASIC or FPGA. Storage device 312 may store, for example, schedule data 314, interference data 316, and shared spectrum database 318.

The NRC 300 may also include a user interface 306 that allows an administrator to interact with the NRC's software and hardware resources and to display information. In addition, the NRC 300 may include a network interface 306 for communicating with other components in first network 218 and second network 220, and a system bus 310 that facilitates data communications between the hardware resources of the NRC 300.

In addition to the controller 212, an NRC 300 may be used to implement other types of computer devices in a communications network, such as an antenna controller, an RF planning engine, a core network element, a database system, or the like. Furthermore, NRC 300 represents elements of various hardware of first network 218 or second network 220. For example, base station 208 and network equipment 216 may have one or more of the components shown in FIG. 3, such as a CPU 304, memory 302, storage device 312, etc. NRC 300 shows many elements of computing devices which are common in network equipment.

Figure 4:
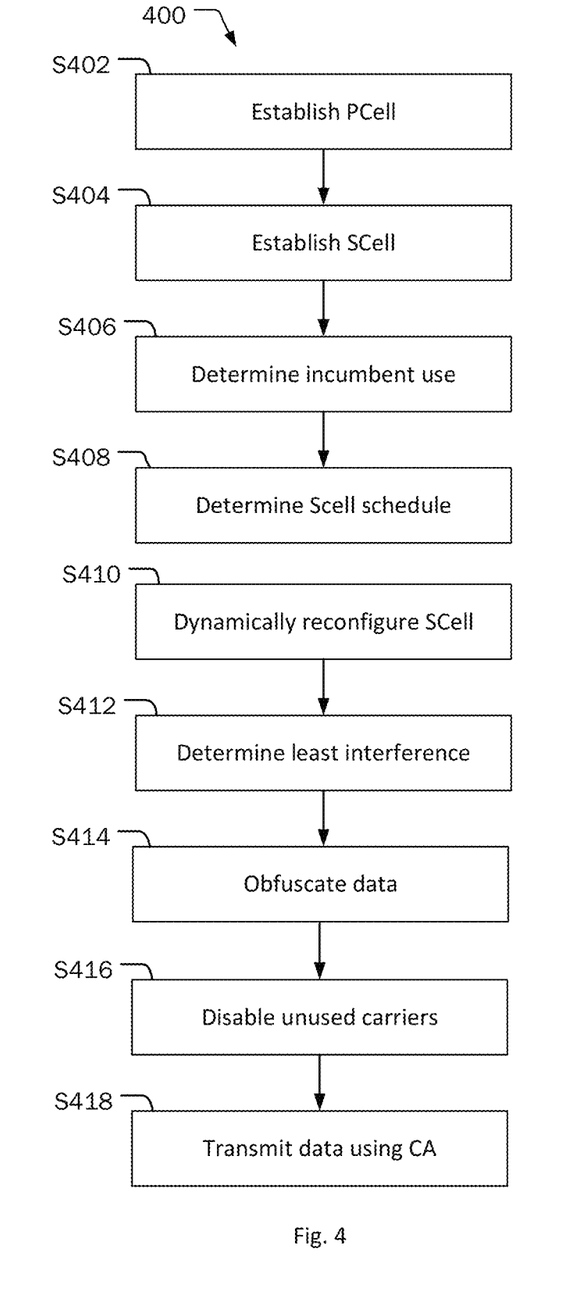
FIG. 4 illustrates an embodiment of a method for carrier aggregation using shared spectrum.

FIG. 4 shows an embodiment of a process 400 for Carrier Aggregation (CA) in a shared spectrum environment. In process 400, a PCell is established at S402. In an embodiment, the PCell is established in a portion of spectrum that is dedicated to cellular telecommunications, and not a portion of the shared spectrum. Because a secondary user may use shared spectrum on an opportunistic basis, establishing the PCell in the shared spectrum would not guarantee continuous service because secondary users, such as a cellular telecommunications network, may be required to give up the portion of the shared spectrum occupied by the PCell when incumbent or primary users want to use that portion of the spectrum.

However, if the secondary user has an RRC connection with a PCell in a portion of spectrum that is exclusively licensed to the network operator managing the PCell, SCells may be configured in the shared spectrum at S404, thereby providing additional radio resources to the UE served by the PCell without any discontinuity of service with inter-band CA.

Since Release 8 UEs see each component carrier (CC) as a Release 8 carrier, any component carrier in shared spectrum is seen as a PCell to Release 8 UEs. In an embodiment, the LTE network in shared spectrum does not allow Release 8 UE to be connected to any shared spectrum CC if it is not dedicated for LTE. Also, base stations in the network may not configure any shared spectrum CC as a PCell to any UE if it is not dedicated for LTE.

The CC for the PCell can have a different bandwidth from the CC for the SCell. Accordingly, a relatively narrow bandwidth, such as 1.4 MHz or 3 MHz may be assigned to the PCell when it is established at S402. One of the functions of a PCell is to ensure continuous connectivity to a UE, and a large portion of bandwidth is not required for this purpose. The PCell may provide low bandwidth connectivity services such as handover operations and fundamental transmissions, while SCells in a portion of shared spectrum support high bandwidth services.

For example, an embodiment may establish a 1.4 MHz CC for a PCell at S402, and establish a 10 MHz SCell that is aggregated with the 1.4 MHz CC at S404. In such an embodiment, the minimum bandwidth of the Primary Component Carrier (PCC) should be sufficient to carry messaging related to UE connectivity, handover, basic service connectivity, etc. Such an embodiment can maximize the number of UE that can connect to PCells in a limited amount of exclusive licensed spectrum, while providing a larger portion of spectrum for data transmissions on an as-needed opportunistic basis using shared spectrum. This scenario is particularly efficient when the shared spectrum is substantially larger than the exclusive spectrum.

Figure 5:
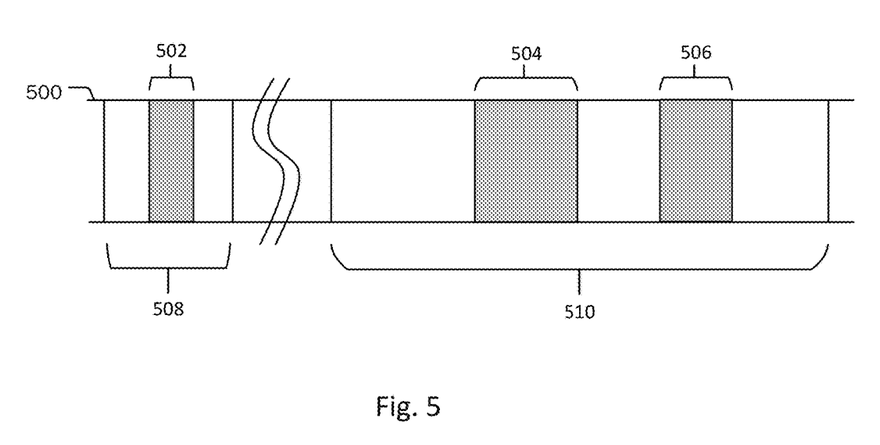
FIG. 5 illustrates an embodiment of a PCell in dedicated spectrum and SCells in shared spectrum.

FIG. 5 shows a PCell component carrier 502 and SCell carriers 504 and 506. Frequency band 500 is divided into an exclusive licensed band 508 that is licensed for cellular telecommunications, and a shared frequency band 510. PCell carrier 502 is aggregated with SCell carriers 504 and 506 using CA. Each carrier 502, 504 and 506 occupies a different amount of bandwidth. Frequency band 500 is not shown to scale, and in a real world implementation, exclusive band 508 could potentially accommodate hundreds of PCell carriers 502, while shared band 510 could potentially accommodate hundreds of SCell carriers 504 and 506.

Use patterns of the incumbent user are determined at S406. An incumbent user of the shared spectrum may have priority over the secondary user. The secondary user may only be permitted to use portions of the shared spectrum that are not being used by the primary user, or portions of the spectrum that do not interfere with the primary user, so that the secondary user has little or no impact on the activities of the primary user.

When incumbent users are allowed to use any portion of shared spectrum at any time, secondary users should identify which portions of spectrum are in use before utilizing the shared spectrum. In one embodiment, secondary users may identify the availability of the shared spectrum by detecting incumbent use with cognitive radio technology.

In another embodiment, a schedule for the incumbent user is received by the controller 212. Thus, in various embodiments, the incumbent use can be determined at S406 by measurement, or by direct or indirect communication with the incumbent user.

A schedule for each SCell in the shared frequency spectrum is determined at S408. The SCell schedule may include times and frequencies for transmissions to and from a UE. The SCell schedule may be determined in order to minimize interference with an incumbent user.

Timing is a consideration for determining the SCell schedule at S408. The UE response delay may be defined as the number of Transmission Time Intervals (TTIs) from the end of reception of the 'E-UTRAN to UE' message on the UE physical layer up to when the UE is ready for the reception of uplink grant for the 'UE to E-UTRAN' response message, with no access delay other than the TTI-alignment (e.g. excluding delays caused by scheduling, the random access procedure or physical layer synchronization). At present, the duration of a TTI for LTE is 1 millisecond.

Figure 6:
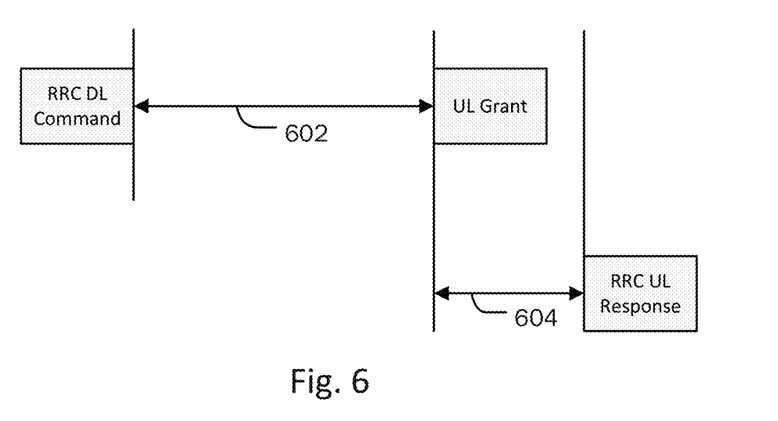
FIG. 6 illustrates an embodiment of cell reassignment timing.

With reference to the embodiment of FIG. 6, the delay 602 for RRC connection reconfiguration for SCell addition/release is 20 TTIs. In LTE, UE response delay 604 is fixed as 4 TTIs for FDD systems, but it may be a variable number between 4 and 6, depending on uplink and downlink configuration and the subframe index where UL grant is sent.

When an SCell is assigned to a UE, it is in a deactivated state and the network activates and deactivates the SCell(s) by sending the Activation/Deactivation MAC control element. Upon receiving an SCell activation command in subframe n, the UE is capable of transmitting a valid Channel State Information (CSI) report for the SCell being activated no later than in subframe n+34. If an SCell is in detectable condition, the activation time can be reduced.

Therefore, the maximum delay requirement for switching an SCell from one band to another is 60 TTIs. Accordingly, the incumbent user should provide its scheduling information to secondary user at least 60 TTIs in advance so that the secondary user can switch the SCell to avoid interference with the incumbent user's transmissions.

Depending on the amount of traffic and incumbent user scheduling, the number of configured SCells can be changed dynamically at S410. Dynamic SCell reconfiguration may be performed as a component of determining SCell schedules at S408. Currently, LTE supports one PCell and up to four SCells for CA for a single UE, and each of the SCells can be dynamically configured according to embodiments of this disclosure. The SCell frequency bands may be periodically adapted to provide expanded bandwidth to UE while avoiding interference to an incumbent user of the shared frequency band.

Frequency bands in the shared spectrum that minimize interference to an incumbent user, and therefore are best candidates for SCell assignment, are determined at S412. If incumbent user scheduling information that includes frequencies and times of incumbent user transmissions and incumbent user spectrum mask information is available, the least interfered frequency band can be found using the following Equation 1:

$$f_i = \min_i \Sigma_j E_T(f_i - f_j) \cdot \delta_j \qquad \text{[Equation 1]}$$

In Equation 1, $f_i$ is the LTE SCell channel index in the shared spectrum, $i=1, \ldots, N$, $f_j$ is the incumbent channel index in the shared spectrum, $j=1, \ldots, M$, $E_T$ is the spectrum mask of incumbent user, and $\delta_j=1$ if the incumbent channel $f_j$ is scheduled during the time span of primary user transmission schedule. Otherwise, the value of $\delta_j$ may be 0. In an embodiment, the choice of frequency bands in the shared spectrum that minimize interference to the incumbent system may also involve analyzing out of band emission of LTE systems.

Dynamic reconfiguration of the SCells S410 may also include changing the number of SCells and changing the bandwidth of any given SCell. When incumbent user transmissions are scheduled in such a way that they would be interfered with by a current SCell configuration, an embodiment may automatically reduce the number of SCells and the frequency and bandwidth of each SCell to avoid interference with the incumbent user in such a way that bandwidth to a UE to which the SCells are attached is maximized.

Figure 7:
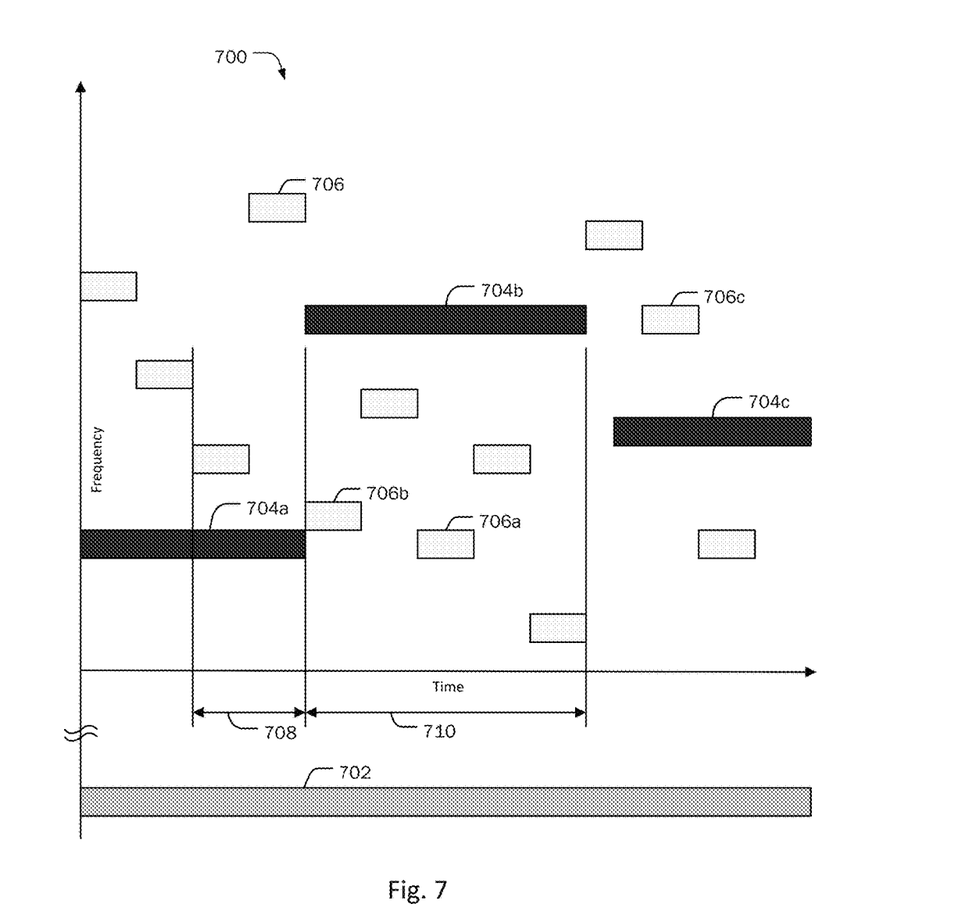
FIG. 7 illustrates an embodiment of dynamic SCell allocation.

FIG. 7 shows a transmission schedule 700 using PCell carrier 702 and SCell carrier 704 in a shared portion of spectrum. PCell carrier 702 occupies a dedicated portion of frequency spectrum, while the SCell carrier 704 shares spectrum with incumbent user transmissions 706. In the embodiment of FIG. 7, the incumbent user transmissions 706 follow a frequency hopping pattern.

In order to avoid interference with incumbent transmissions 706, a transmission schedule for the SCell carrier 704 during time interval 710 is determined in advance of switching time 708. If carrier 704a were to maintain the same frequency for time interval 710, it would interfere with at least incumbent transmission 706a in the same frequencies, and may interfere with incumbent transmission 706b.

To avoid this interference, the frequency band occupied by SCell carrier 704a is dynamically changed to the frequencies of SCell carrier 704b for time interval 710. Similarly, the frequency band occupied by SCell carrier 704b is dynamically changed to the frequency band of SCell carrier 704c to avoid interference with incumbent transmission 706c. The frequencies of 704b and 704c may be identified by applying Equation 1.

During the switching period 708, the previously activated SCell carrier 704a may be used continuously and may be deactivated as soon as the other SCell carrier 704b is activated. The deactivation can be done with the CA deactivation timer sCellDeactivationTimer in LTE. Thus, the secondary user can have continuous service with minimal interference.

Further, the time span 710 of the primary user transmission schedule can be divided into shorter durations so that SCell carrier 704 can be switched to a less interfered frequency band during the scheduled transmissions of a primary user. When the duration 710 is longer than the SCell switching delay 708, the secondary user can hop to a minimally interfered frequency band without any discontinuity of service for the SCell. The overhead from RRC reconfiguration messaging for SCell activation/deactivation should be considered in determining the SCell switching period as well.

Figure 8:
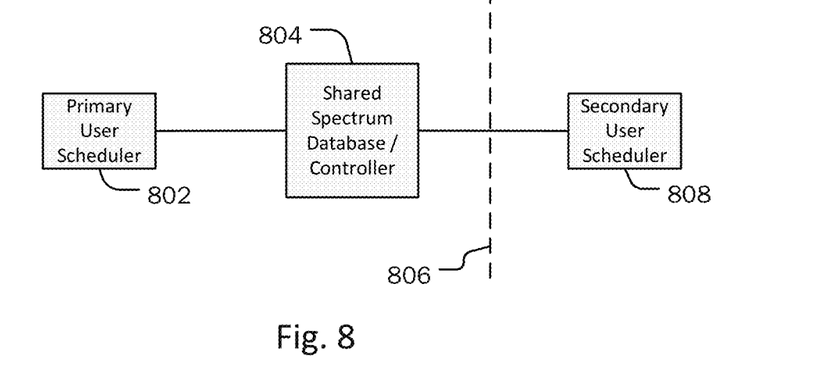
FIG. 8 illustrates an embodiment of a transmission schedule.

In an embodiment, schedule data for the incumbent user is obfuscated for the secondary user at S414. Data obfuscation will be explained with reference to FIG. 8, which shows a scheduling process. In the embodiment of FIG. 8, primary user scheduler 802 transmits schedule data to controller 804. The schedule data may be sent automatically or in response to a schedule request signal.

In some embodiments, the primary or incumbent user of the shared spectrum may wish to maintain a level of confidentiality with respect to details of its transmission schedule. For example, the primary user may be a military user, and details of the military transmissions may be classified information. Alternatively, primary user schedule information may be proprietary information that the primary user wishes to protect. Therefore, in an embodiment, the schedule information is obfuscated so that confidential schedule information does not pass boundary 806 to secondary user scheduler 808. In addition, any or all communications between primary scheduler 802, controller 804, and secondary scheduler 808 may be encrypted.

Schedule information may be obfuscated to the secondary scheduler in multiple ways. In one embodiment, no primary user scheduler information is transmitted from the controller to the secondary user scheduler. Instead, controller 804 may transmit portions of available time and spectrum that are available for the secondary user scheduler 802 to schedule transmissions. The portions of available time and frequency may be selected to obscure precise details of the times and frequencies of the primary user's schedule.

In another embodiment, controller 804 may perform scheduling of the secondary user. In such an embodiment, controller 804 may send a transmission schedule for SCells in a shared spectrum to secondary user scheduler 808.

In various embodiments, components of the controller 804 and secondary user scheduler 808 may be present in various hardware entities. Controller 804 corresponds to controller 212, which may be, for example, a SON controller or an RRC, while secondary user scheduler 808 may correspond to a base station 208 or an RRC for the secondary network.

Unused carriers of the secondary network are disabled at S416. The unused carriers may be any component carrier for which no transmissions to UE are scheduled. Disabling carriers in the shared spectrum that are not in use increases the bandwidth available for dynamic reconfiguration of SCells, and reduces the chance that the primary user will experience interference from the secondary user. Disabling an SCell may include ceasing all transmissions associated with the SCell, or eliminating the SCell.

Data is transmitted between UE and a base station using CA of a PCell in dedicated spectrum that is aggregated with one or more SCell in shared spectrum at S418. The data may be transmitted according to a schedule that minimizes interference to an incumbent, or primary user of the shared spectrum. The transmissions continue even when the one or more SCell in the shared spectrum is dynamically reconfigured to avoid interference with the primary user.

Embodiments of the present disclosure include a system that utilizes LTE CA processes to facilitate sharing of common spectrum bands. A system according to an embodiment utilizes a primary component carrier (PCC) channel in non-shared spectrum along with one or more secondary component carrier (SCC) channels in shared spectrum to ensure network access via the PCC with opportunistic network capacity via the shared spectrum SCC(s).

A shared spectrum CA system according to an embodiment utilizes a PCC and SCC(s) of differing occupied bandwidth to minimize occupancy of non-shared spectrum (PCC) while opportunistically delivering high network capacity via shared spectrum SCC(s), such as a 1.4 MHz PCC coupled to one or more 10 MHz SCC. A shared spectrum CA system according to an embodiment dynamically reconfigures the SCC operating frequency for purposes of proactively or retroactively avoiding interference between other spectrum users.

A dynamic SCC channel switching system according to an embodiment proactively avoids interference with other users of shared spectrum by establishing a forward looking channel switching schedule and implicitly or explicitly forwarding such a channel switching schedule to other users of spectrum such that they may avoid the dynamic SCC transmissions. A dynamic SCC channel switching system may receive a forward looking channel occupancy schedule from other shared spectrum system and utilize SCC channel switching to avoid interference with the known channel occupancy. It may also minimize interference to the other by turning off all the CCs on which no data transmissions to UEs are scheduled.

A dynamic SCC channel switching system according to an embodiment senses interference on its current operating channel, scans for and senses clear channels and reconfigures its SCC(s) to operate on one or more currently clear channels (retroactive channel occupancy avoidance). The dynamic SCC channel switching system allocates different SCC channel switching patterns to different system cells and/or users to reduce aggregate radio frequency energy concentrated in individual channels in order to reduce aggregate narrowband noise rise (interference energy) to other band limited systems operating in the overall shared spectrum band.

A dynamic SCC channel switching system according to an embodiment employs channel schedule obfuscation to reduce the potential for jamming or message interception to or from secure systems operating in shared spectrum. Examples include obfuscating a forward looking radar frequency hopping pattern such that a dynamic SCC channel switching system may still avoid operating channels of interest, but such that potential radar jammers that intercept the radar forward looking channel message cannot easily determine the exact radar operating frequency at future times.

This disclosure provides several improvements to communications technology, including a coordinating entity between primary and secondary networks, specific coordination between the primary and secondary networks, obfuscation of primary schedule data to the secondary network, providing a plurality of SCells in a shared frequency band, and allocating SCells to a least interfered portion of shared spectrum. Thus, embodiments of the present disclosure facilitate using substantial portions of unused spectrum while minimizing impact to an incumbent user.

What is claimed is:

1. A method for performing Carrier Aggregation (CA) using spectrum shared between an incumbent user and a telecommunications network, the method comprising:
   establishing a primary cell (PCell) for the telecommunications network in a portion of radio spectrum that is exclusively licensed to the telecommunications network;
   establishing a secondary cell (SCell) for the telecommunications network in a portion of the shared spectrum that is shared with the incumbent user;
   receiving schedule data for the incumbent user at a controller in communication with the incumbent user and a transmitter for the PCell and the SCell, the schedule data being based on a plurality of times and frequencies for future transmissions of the incumbent user;
   using the schedule data to determine that a second frequency band is not occupied by incumbent user transmissions in the shared spectrum at a future time;
   scheduling transmissions for the SCell in the second frequency band at the future time; and
   transmitting the scheduled transmissions through the PCell and the SCell using Carrier Aggregation (CA),
   wherein the controller receives the schedule data at least 60 Time Transmission Intervals (TTIs) in advance of the future time.

2. The method of claim 1, wherein the schedule data for the incumbent user indicates interference from the SCell to the incumbent user, the method further comprising:
   dynamically reconfiguring the SCell by moving the SCell from a first frequency band to the second frequency band at the future time to avoid the interference from the SCell to the incumbent user.

3. The method of claim 2, further comprising:
   determining a frequency band in the shared spectrum with the least chance of interfering with the incumbent user, wherein the second frequency band is the frequency band with the least chance of interfering with the incumbent user.

4. The method of claim 2, wherein the schedule data for the incumbent user includes a spectrum mask, the method further comprising:
   using the spectrum mask to determine that the second frequency band has a lowest probability of interfering with incumbent user transmissions of frequency bands in the shared spectrum.

5. The method of claim 1, wherein the schedule data is received by a central controller entity that coordinates scheduling between the incumbent user and the telecommunications network.

6. The method of claim 1, wherein schedule data for the incumbent user is not transmitted to a scheduler for the primary and secondary cells.

7. The method of claim 1, further comprising:
   disabling unused secondary cells in the shared spectrum.

8. The method of claim 1, wherein the bandwidth occupied by the PCell is half or less of the bandwidth occupied by the Scell.

9. The method of claim 1, wherein the incumbent user uses a frequency hopping transmission pattern in the shared spectrum.

10. A telecommunications system that performs Carrier Aggregation using shared spectrum, the system comprising:
    a controller with a communication channel to network equipment of an incumbent user of the shared spectrum, the controller receiving schedule data for the incumbent user over the communication channel and using the schedule data to determine that a second frequency band is not occupied by incumbent user transmissions in the shared spectrum at a future time, the schedule data being based on a plurality of times and frequencies for future transmissions of the incumbent user; and a base station in communication with a user equipment (UE), the base station being operative to:
  establish a primary cell (PCell) for the incumbent user in a portion of radio spectrum that is exclusively licensed to a telecommunications network;
  establish a secondary cell (SCell) for the telecommunications network in a portion of the shared spectrum that is shared with the incumbent user; and
  transmit the scheduled transmissions through the PCell and the SCell using Carrier Aggregation (CA),
wherein transmissions for the SCell are scheduled at the future time in the second frequency band, and
wherein the controller receives the schedule data at least 60 Time Transmission Intervals (TTIs) in advance of the future time.

11. The system of claim 10, wherein, when the schedule data for the incumbent user indicates interference from the SCell to the incumbent user, the base station dynamically reconfigures the SCell by moving the SCell from a first frequency band to a second frequency band to avoid the interference from the SCell to the incumbent user.

12. The system of claim 11, wherein the second frequency band is a frequency band with the least chance of interfering with the incumbent user.

13. The system of claim 11, wherein the schedule data for the incumbent user includes a spectrum mask, and the controller uses the spectrum mask to determine that the second frequency band has a lowest probability of interfering with incumbent user transmissions of frequency bands in the shared spectrum.

14. The system of claim 10, wherein the controller coordinates scheduling between the incumbent user and the base station.

15. The system of claim 10, wherein schedule data for the incumbent user is not transmitted to a scheduler for the primary and secondary cells.

16. The system of claim 10, wherein the base station disables unused secondary cells in the shared spectrum.

17. The system of claim 10, wherein the bandwidth occupied by the PCell is half or less of the bandwidth occupied by the Scell.

18. The system of claim 10, wherein the incumbent user uses a frequency hopping transmission pattern in the shared spectrum.

19. The method of claim 1, wherein the incumbent user is a radar system.

20. The method of claim 19, wherein actual transmission times and frequencies of the radar system are obfuscated for the telecommunications network.

21. A method for performing Carrier Aggregation (CA) using spectrum shared between an incumbent user and a telecommunications network, the method comprising:
  establishing a primary cell (PCell) for the telecommunications network in a portion of radio spectrum that is exclusively licensed to the telecommunications network;
  establishing a secondary cell (SCell) for the telecommunications network in a portion of the shared spectrum that is shared with the incumbent user;
  receiving schedule data for the incumbent user at a controller in communication with the incumbent user and a transmitter for the PCell and the SCell, the schedule data being based on a plurality of times and frequencies for future transmissions of the incumbent user;
  using the schedule data to determine that a second frequency band is not occupied by incumbent user transmissions in the shared spectrum at a future time;
  determining a frequency band in the shared spectrum with the least chance of interfering with the incumbent user;
  scheduling transmissions for the PCell and the SCell to avoid interference to the incumbent user at the future time;
  dynamically reconfiguring the SCell by moving the SCell from a first frequency band to the second frequency band at the future time to avoid the interference from the SCell to the incumbent user; and
  transmitting the scheduled transmissions through the PCell and the SCell using Carrier Aggregation (CA)
wherein the schedule data for the incumbent user indicates interference from the SCell to the incumbent user,
wherein the second frequency band is the frequency band with the least chance of interfering with the incumbent user, and
wherein the least interfered frequency band is determined using the following Equation 1:

$$f_i = \min_i \Sigma_j E_T(f_i - f_j)$$

in which $f_i$ is a channel index of the Scell in the shared spectrum, $i=1, \ldots, N$, $f_j$ is a channel index of the incumbent user in the shared spectrum, $j=1, \ldots, M$, and $E_T$ is a spectrum mask of the incumbent user.

* * * * *